(No Model.)
A. J. MARSCHALL.
RENNET TEST FOR MILK.
No. 553,349. Patented Jan. 21, 1896.
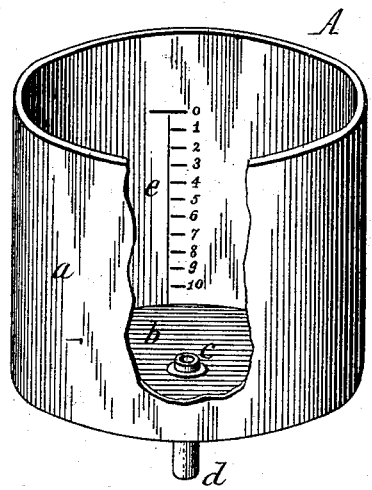
WITNESSES:
Chas. F. Burkhardt
Henry L. Deck.
Adolf J. Marschall
INVENTOR.
By Wilhelm Bonner
ATTORNEYS.

UNITED STATES PATENT OFFICE.

ADOLF JOHANNES MARSCHALL, OF LITTLE FALLS, NEW YORK.

RENNET TEST FOR MILK.

SPECIFICATION forming part of Letters Patent No. 553,349, dated January 21, 1896.

Application filed July 29, 1895. Serial No. 557,459. (No specimens.)

*To all whom it may concern:*

Be it known that I, ADOLF JOHANNES MARSCHALL, a subject of the King of Denmark, residing at Little Falls, in the county of Herkimer and State of New York, have invented a new and useful Improvement in Rennet Test for Milk, of which the following is a specification.

The object of this invention is to produce a rennet test which is simple and reliable and which can be conveniently manipulated by the average cheese-maker.

To secure uniformity in the manufacture of cheese the milk should be ripened to a certain extent before it is set with rennet for curdling. The degree of ripeness which the milk has when it is received at the cheese-factory varies according to the care which has been applied by the farmers, the state of the weather and other circumstances. It is important that the cheese-maker should be able to judge of the condition of his milk in order to determine whether it is ready, as soon as heated to the proper degree, to be set with rennet, or whether the ripening should be allowed to progress further before adding the rennet by leaving it warm for an hour or two, or whether a starter should be added. The cheese-maker should also be able to judge of the strength of his rennet extract, so that he may regulate the quantity which is used in such a way as to curdle the milk in the proper time, and this is particularly important when he changes his rennet extract.

The rennet test heretofore generally used consists in measuring off a certain quantity of milk at a certain temperature, adding thereto a certain measured quantity of diluted rennet extract, and observing the number of seconds which it takes to curdle the milk. It is, however, difficult work, rather more suitable for a chemist than for a cheese-maker, to observe the exact time in seconds and especially to notice the point when milk curdles. In my improved test these difficulties are entirely avoided.

The accompanying drawing is a perspective view of the apparatus used in my improved test, with a portion of the upright wall broken away to expose the interior.

A represents a cup holding about one liter of milk, more or less, $a$ the side wall, and $b$ the bottom of the cup. The bottom is provided with an outlet $c$, which is reduced to a certain small size by the insertion of a fine glass tube $d$. The side wall of the cup is provided with an upright graduation or scale $e$ extending from the bottom upwardly and beginning at its upper end, preferably at zero, and reading downward.

The rennet extract is measured off by a one-cubic-centimeter pipette and is diluted with about half an ounce of pure water. The cup is filled with the milk to be tested previously heated to the proper degree (about 86° Fahrenheit) in the cheese-vat and is so placed that the milk escapes through the outlet in the bottom. When the level of the milk in the cup has dropped to the zero point, the diluted rennet extract is added and thoroughly mixed with the milk by stirring. The milk is then left alone and continues to escape through the glass tube $d$ until it curdles, when it stops running. The level of the curdled milk is read off on the scale and indicates to the cheese-maker the condition of the milk as to its ripeness and the strength of the rennet extract.

Experience teaches the cheese-maker just where the level of the curdled milk should stand on the scale when the milk is ripe enough to be set. If the level of the curdled milk stands below that point, it indicates that the milk is not sufficiently ripe and that he must allow the ripening to proceed. One or more further tests will show when the milk is in the proper condition of acidity to be set. If the level of the curdled milk stands above the point of the scale at which it should stand, it indicates that the milk is more than sufficiently ripe and that it should be treated accordingly.

It is obvious from the foregoing that after the rennet extract has been mixed with the milk the latter requires no further attention, but can be left alone, as the escape of the milk will stop when the milk curdles and the level of the curdled milk can be readily read off by the cheese-maker when most convenient. The necessity of timing a test is therefore entirely avoided.

The glass tube or other escape-aperture through which the milk escapes from the vessel is taken of such size that the milk will in no case be all discharged from the vessel before the milk curdles. Preferably the size of the escape tube or aperture is such that the milk will drop to about half the height of the scale when the curdling takes place under normal conditions.

I claim as my invention—

The herein described method of testing milk with rennet which consists in mixing the rennet with the milk, allowing the milk to escape through a discharge aperture which has not sufficient capacity to permit of the escape of the entire volume of milk before it curdles and through which the milk ceases to escape when it has curdled, and observing the level of the curdled milk, substantially as set forth.

Witness my hand this 25th day of July, 1895.

ADOLF JOHANNES MARSCHALL.

Witnesses:
 WATTS T. LOOMIS,
 JOHAN D. FREDRICKSON.